US008281236B2

(12) United States Patent
Gundorov (10) Patent No.: US 8,281,236 B2
(45) Date of Patent: Oct. 2, 2012

(54) REMOVING STYLE CORRUPTION FROM EXTENSIBLE MARKUP LANGUAGE DOCUMENTS

(75) Inventor: Sergei Gundorov, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 83 days.

(21) Appl. No.: 12/877,860

(22) Filed: Sep. 8, 2010

(65) Prior Publication Data

US 2012/0060086 A1 Mar. 8, 2012

(51) Int. Cl.
 *G06F 17/00* (2006.01)
(52) U.S. Cl. ...................................... 715/236
(58) Field of Classification Search .......... 715/235, 715/236, 237
See application file for complete search history.

(56) References Cited

U.S. PATENT DOCUMENTS

| | | | | |
|---|---|---|---|---|
| 6,463,440 | B1* | 10/2002 | Hind et al. ................ | 715/235 |
| 6,567,826 | B1 | 5/2003 | Fischer et al. | |
| 6,584,480 | B1* | 6/2003 | Ferrel et al. ................ | 715/205 |
| 6,589,291 | B1* | 7/2003 | Boag et al. ................ | 715/235 |
| 7,017,162 | B2* | 3/2006 | Smith et al. ................ | 719/328 |
| 7,080,083 | B2* | 7/2006 | Kim et al. ................ | 715/236 |
| 7,117,429 | B2* | 10/2006 | Vedullapalli et al. ........ | 715/235 |
| 7,152,055 | B2* | 12/2006 | Loschky et al. ............... | 1/1 |
| 7,356,522 | B2* | 4/2008 | Herrera et al. ................ | 706/47 |
| 7,428,582 | B2* | 9/2008 | Bean et al. ................ | 709/218 |
| 7,673,231 | B2* | 3/2010 | Bajaj et al. ................ | 715/237 |
| 7,930,368 | B2* | 4/2011 | Kazerouni et al. ............ | 709/219 |
| 2003/0229605 | A1* | 12/2003 | Herrera et al. ................ | 706/47 |
| 2004/0001087 | A1* | 1/2004 | Warmus et al. ............... | 345/745 |
| 2004/0205491 | A1* | 10/2004 | Korala et al. ............... | 715/501.1 |
| 2005/0223100 | A1* | 10/2005 | Chen et al. ................ | 709/228 |
| 2007/0022128 | A1* | 1/2007 | Rothschiller et al. ......... | 707/100 |
| 2008/0077870 | A1* | 3/2008 | Napoleon ................ | 715/762 |
| 2008/0077879 | A1* | 3/2008 | Black ................ | 715/784 |
| 2008/0189679 | A1* | 8/2008 | Rodriguez et al. ............ | 717/105 |
| 2008/0313659 | A1* | 12/2008 | Eide et al. ................ | 719/328 |
| 2010/0165380 | A1* | 7/2010 | Grams ................ | 358/1.15 |
| 2011/0016379 | A1* | 1/2011 | McColl et al. ................ | 715/219 |
| 2011/0099467 | A1* | 4/2011 | Kapur et al. ................ | 715/236 |

OTHER PUBLICATIONS

"Microsoft Office document corruption: Testing the OOXML claims", Retrieved at <<http://www.robweir.com/blog/2010/02/office-document-corruption.html>> Feb. 15, 2010>> pp. 15.
Matt, "Corrupt excel—copy paste between instances", Retrieved at <<http://www.tech-archive.net/pdf/Archive/Excel/microsoft.public.excel.misc/2009-03/msg02754.pdf>> Mar. 11, 2009, p. 1.
Rodriguez, Stephane, "MSOOXML Technical considerations of spreadsheet functionalities", Retrieved at <<http://www.google.co.uk/url?sa=t&source=web&cd=1&ved=0CBkQFjAA&url=http%3A%2F%2Fwww.openforumeurope.org%2Flibrary%2FODF%2Fofe-technical-issues-with-spreadsheets-and-ooxml.pdf%2Fdownload&rct=j&q=%22Technical%20considerations%20ofspreadsheet%20functionalities%22&ei=3x5ZTKDVGMOx4AaJ8tyrCw&usg=AFQjCNFjQKqV318dLFIWFB5wjvzOIMaQ2Q&cad=rja>> Oct. 22.

(Continued)

*Primary Examiner* — Laurie Ries
(74) *Attorney, Agent, or Firm* — Turk IP Law, LLC (57) ABSTRACT

Unused, duplicate, or corrupted styles are removed from XML based document files through a styles definition part of a document using system input output. The removal is based on the analysis of the information contained in a compressible package of a respective document file. Other incorrect file content may also be removed such as corrupted name ranges or unused value format definitions using the same approach.

19 Claims, 7 Drawing Sheets

OTHER PUBLICATIONS

"Excel Repair Tool to Fix Corrupt Excel Files or Documents", Retrieved at <<http://www.excelrecoverytool.com/excel-fix.html>> Retrieved Date: Aug. 3, 2010, p. 1.

Pieterse, Jan Karel, "Method to Delete Corrupt Defined Names in Excel", Retrieved at <<http://support.microsoft.com/kb/555127>> Jun. 2, 2004, Revision: 1.0, pp. 2.

"Recovering data from corrupted files in OpenOffice documents", Retrieved at <<http://www.andybrain.com/archive/mb/open-office-data-recovery.htm>> Retrieved Date: Aug. 3, 2010, p. 2.

"Stellar Phoenix Excel Repair v.3.2", Retrieved at <<http://www.stellarinfo.com/excel-recovery.htm>> Retrieved Date: Aug. 3, 2010, pp. 3.

"Style reduction tool", Retrieved at <<http://xlsgenreduction.arstdesign.com/index_en.html>> Retrieved Date: Aug. 3, 2010, pp. 6.

Quarrell, Peter J., "Excel workbook analysis to deal with an urgent problem", Retrieved at <<http://www.rowingservice.com/quarrell/QAid>>Retrieved Date: Aug. 3, 2010, p. 13.

* cited by examiner

REMOVING STYLE CORRUPTION FROM EXTENSIBLE MARKUP LANGUAGE DOCUMENTS

BACKGROUND

Extensible Markup Language (XML) is a set of standardized rules for encoding electronic documents in machine-readable format for simplicity, generality, and usability over the Internet. While the design of this textual data format focuses on documents, it is widely used for the representation of arbitrary data structures, for example in web services. There are various versions and variations of XML. One example of XML type use is the standardized Office Open XML (OOXML) file format developed by Microsoft Corp. of Redmond, Wash. OOXML includes a set of file formats that can be used to represent electronic office documents. The formats define a set of XML markup vocabularies for word processing documents, spreadsheets, and presentations as well as specific XML markup vocabularies for content such as mathematical formulas, graphics, bibliographies, and comparable ones. The standardized OOXML format is intended to facilitate extensibility and interoperability by enabling implementations by multiple creators and on multiple platforms.

A style definition document part commonly referred to as a "style sheet" is a form of separation of presentation and content in document processing programs that store and apply formatting to text. Individual styles may be included in document templates as default styles or created by the users with a wide variety of commands that dictate how a selected portion of data is formatted. Style sheets help publications maintain consistency such that common elements such as body, headlines, footnotes, number formatting, font color, background color etc. always appear the same. Style sheets also save time allowing an author to apply a format to selected elements in one operation instead of one at a time.

When using custom style definitions in documents, there is a potential for corrupting file contents. In certain scenarios, when contents are copied from multiple documents, having custom styles may lead to file corruption due to variety of reasons related to document architectures. An OOXML package is a compressed (or compressible) package containing XML documents and other resources such as style definitions associated with the document(s). Contents of an OOXML package may be accessed by an application or tool without having to activate an application for editing the documents themselves.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to removal of unused, duplicate, or corrupted styles from XML based document files. The removal may involve a custom styles part of the document using system input output and be based on the analysis of the information contained in a compressible package of a respective document file. Other incorrect file content may also be removed such as corrupted name ranges or unused value format definitions using the same approach.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, unused, duplicate or corrupted styles may be removed from XML files' styles part using system input output components. Analysis of the information contained in XML package parts may guide the removal of corrupted parts. Other incorrect file contents may also be removed. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for managing computer and network operations. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
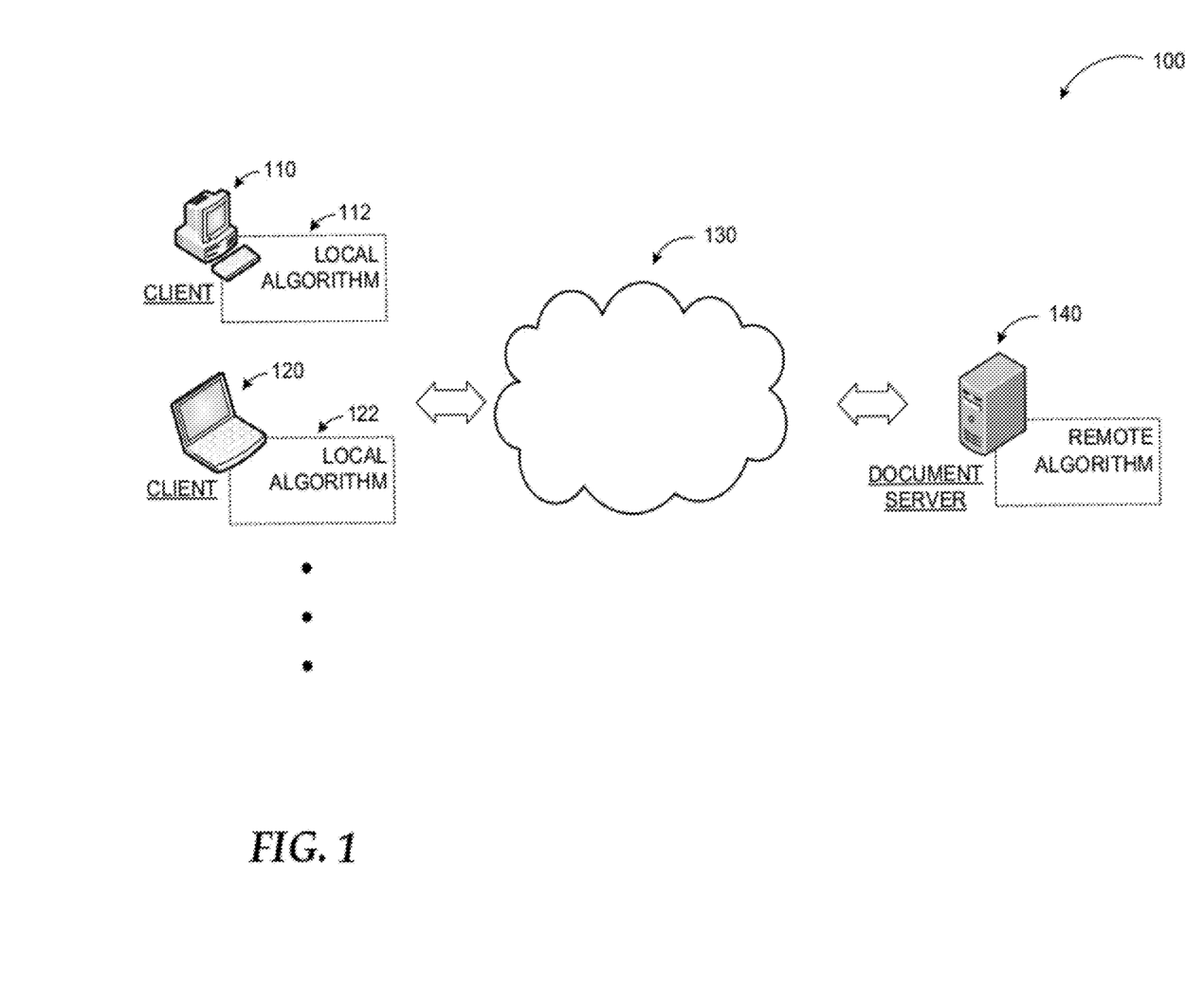
FIG. 1 is a diagram illustrating the examples of local and remote corruption removal algorithms.

FIG. 1 is a diagram illustrating examples of local and remote corruption removal algorithms. In diagram 100, a locally executed algorithm 112 may access XML documents stored locally on computer 110. The computer may be any computing device such as a desktop computer, a notebook, a handheld computer, a cellular phone, a smart phone, a PDA, and similar devices. The algorithm may assess the corruption of the custom style definitions and remove them (e.g. remove custom style definitions). The algorithm may also keep used style definitions after determining which ones are used by a document to avoid document corruption due to number of styles exceeding a predefined threshold. Similarly, local algorithm 122 may be executed on laptop computer 120, etc.

The local algorithms may be provided to computing devices (110, 120) through a variety of means such as network downloading, manual installation (e.g. using a portable data storage device), or comparable methods. According to some embodiments, multiple instances of the local algorithm may be executed to process multiple documents. In each case, activation of an application associated with the document (e.g. a spreadsheet application, a word processing application, etc.) is not necessary since the algorithm can access style parts without having the document open.

In other embodiments, removal algorithm may be hosted at a remote server 140. The local computers 110 and 120 may access documents on the document server through network(s) 130 such as in a document sharing web service. The shared documents may include spreadsheets, word processing documents, presentations, etc. structured as XML documents. Thus, the documents may be stored in packages containing XML documents and other resources such as style definitions associated with the document(s). The remote algorithm may scan the documents periodically or upon demand and remove corrupt custom styles without opening respective documents.

Figure 2:
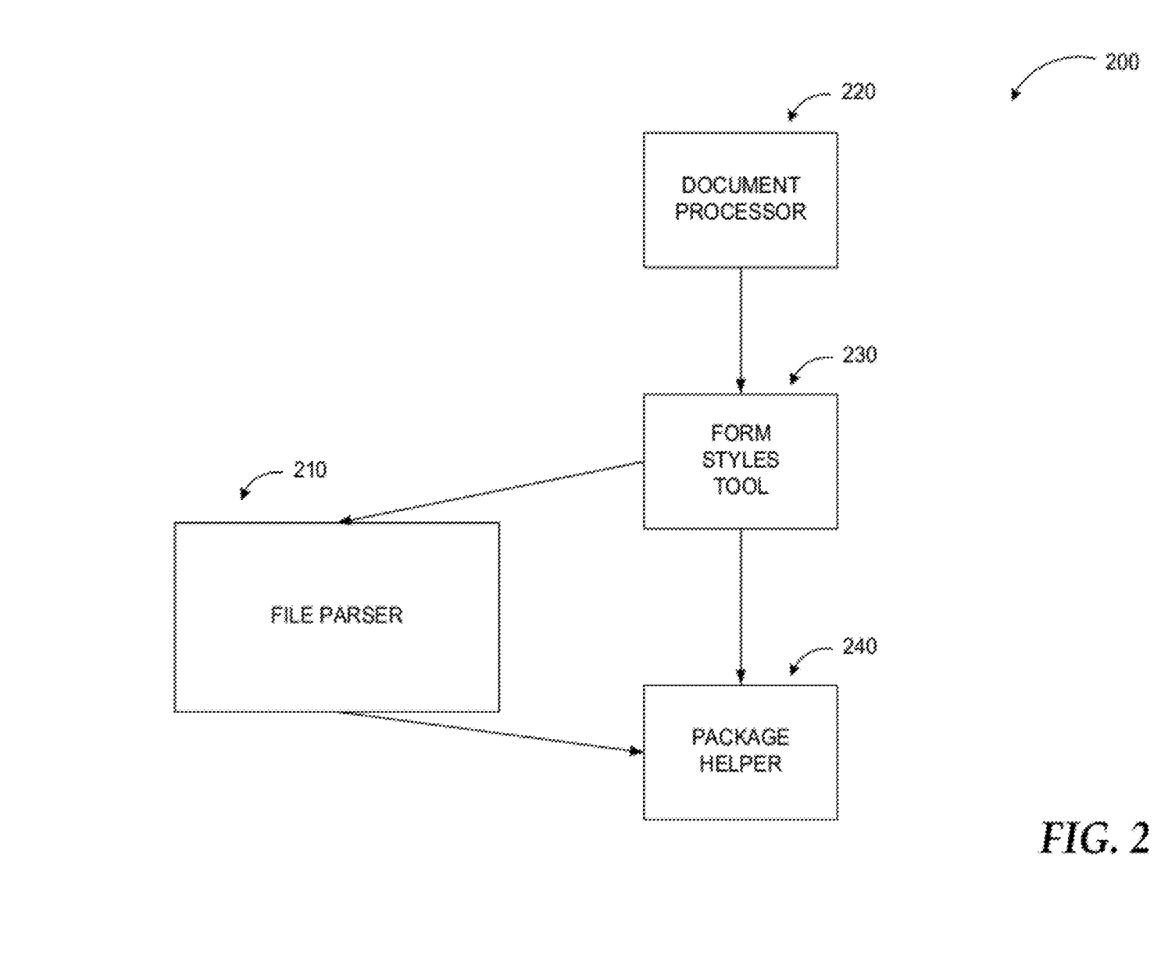
FIG. 2 illustrates a system diagram displaying major components of the corruption removal algorithm.

FIG. 2 illustrates a system diagram displaying major components of the corruption removal algorithm. In diagram 200, document processor 220 may be a filtering application for rapid processing of XML documents. Such a module may open a plurality of XML documents including, but not limited to, spreadsheets, charts, word processing documents, and presentations. Document processor 220 may quickly open documents through the use of system IO.

Form styles tool 230 may be graphical tool set to utilize core application module file parser 210. Form styles tool 230 may present a user with an interface to enable the user to interact with the file parser 210 graphically. Package helper module 240 may determine validity of a user requested or system requested XML package and open the package in a byte stream. File parser 210 may programmatically remove unused, duplicate, or corrupted styles from the styles part of the XML package without activating a rich client (application associated with the particular document type) based on the analysis of the information contained in the XML package parts of respective files.

Figure 3:
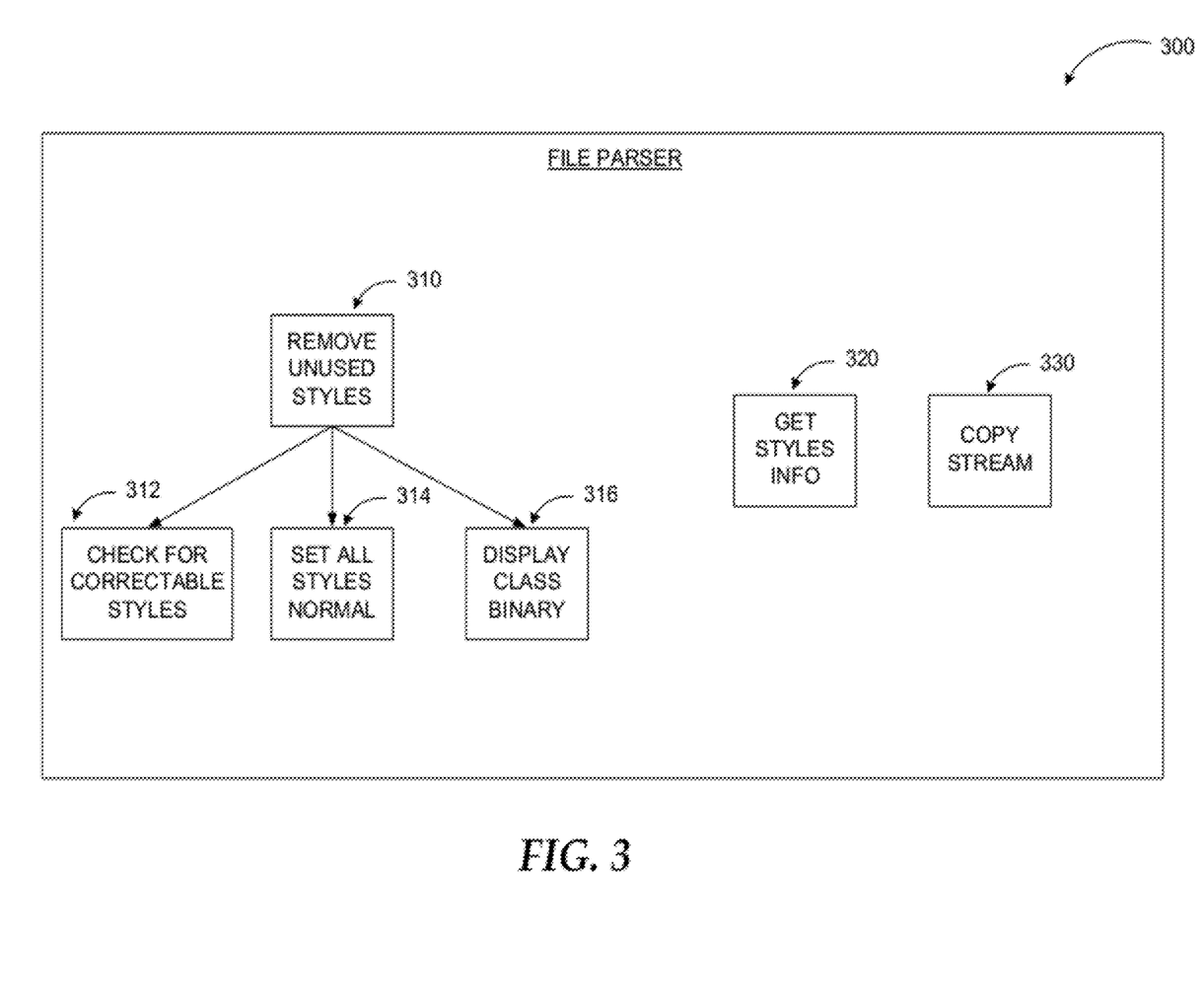
FIG. 3 illustrates individual modules within the corruption removal algorithm.

FIG. 3 illustrates individual modules within the corruption removal algorithm. File parser module 300 may implement an example custom style definition based corruption removal algorithm according to some embodiments. A component 320 of the file parser module 300 may obtain styles information from styles parts of the XML package for a document without activating a rich client application while another component 330 may copy contents of the file from one instance of the file to another. The changes may be performed on the same file stored in memory as well. File parser module 300 may remove unused styles (310) by scanning all style parts contained in the XML package (e.g. by component 320), matching the styles defined in the document to the parts contained in the package, and identifying unused and/or duplicate styles. Duplicate styles may also be removed.

File parser module 300 may also check for correctable styles (312) among the custom styles. Default styles (as opposed to custom styles) also referred to as built-in styles are less susceptible to corruption, but they can also get corrupted in some instances. Corrupted built-in styles typically cannot be removed using client application object model, but can be accessed and corrected using the algorithm described in this document. According to other embodiments, a component of file parser module 300 may set all styles to normal (314) by resetting the styles to default format. Yet another component may provide ability to optionally display the document (316).

The file parser module 300 may also provide the style information to a user for feedback or configuration purposes. Furthermore, the style information may be used, as discussed above, in an automatic decision process by the algorithm whether to keep or discard used custom styles.

Figure 4:
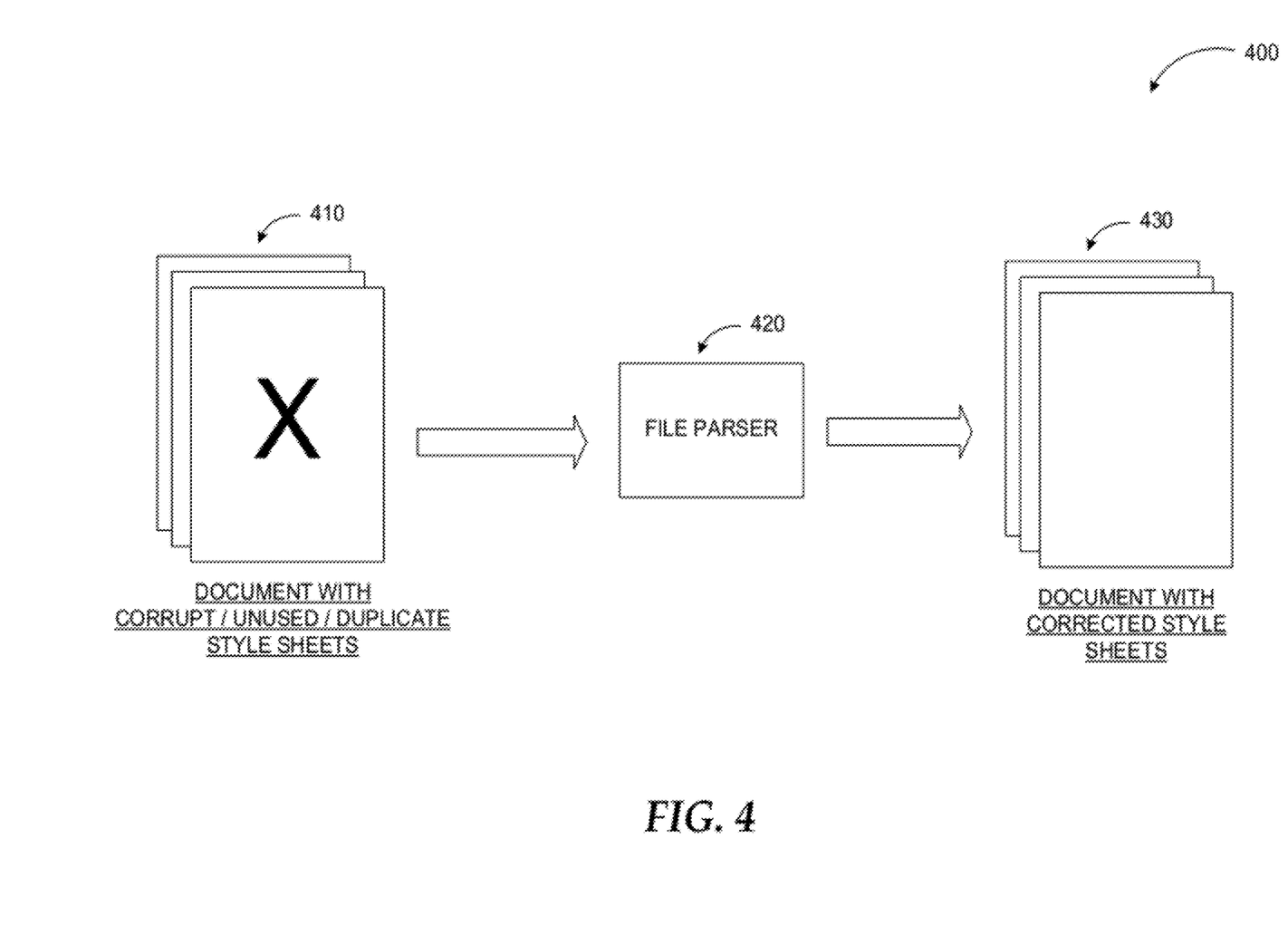
FIG. 4 illustrates conceptually corrupted styles definitions removal from an XML document.

FIG. 4 illustrates conceptually corrupted style definition removal from an XML document. The removal algorithm implemented by file parser 420 may scan document 410 with multiple style definitions some of which may be corrupt, unused, or duplicate. Once corrupt, unused, and/or duplicate styles are identified, file parser 420 may attempt to remove those resulting in the document 430 with corrected style definitions. If removal is not feasible or fails, file parser 420 may set the document to default format with default styles of the client application by performing a set to normal operation.

Copy and paste operations between documents may increase a number of custom styles in the final document because formatting of copied data is also carried over to the new document. There may be a predetermined number of custom styles limit for each client application. If the number of custom styles exceeds the limit, the document may become corrupted and move to an unrecoverable state. The predetermined limit of custom styles to reach unrecoverable corruption may be relatively high (for example, 65534 for some spreadsheet applications). However, in a document sharing environment, where data within documents is modified, copied, pasted constantly by multiple users, such limits can be reached in a relatively short time frame. To prevent user frustration and wasting of time and energy to recreate the document(s), a corruption removal algorithm may be executed in the background of such document sharing services constantly reducing the number of style definitions associated with each document by removing corrupt, unused, or duplicate styles.

The algorithm may use a system input/output (I/O) library for direct access to the XML files. The system I/O libraries provide direct access to the corrupt files. This may eliminate the need to open the corrupt file in an associated application such as a word processor application, a spreadsheet application, a diagramming application, a browsing application, or a presentation application in order to clean up the styles or other content.

According to some embodiments, the XML document corruption removal algorithm may be a standalone command line executable. According to other embodiments, the algorithm may be implemented as an independent application with graphical user interface. According to further embodiments, the algorithm may be implemented as a server side library integrated with server side applications for automatically correcting documents (e.g. a server side feature or set of tools).

The systems and implementations of a style corruption removal algorithm discussed above are for illustration purposes and do not constitute a limitation on embodiments. Corrupt, unused, or duplicate styles may be removed from structured documents such as XML documents with other modules, processes, and configurations using the principles discussed herein.

Figure 5:
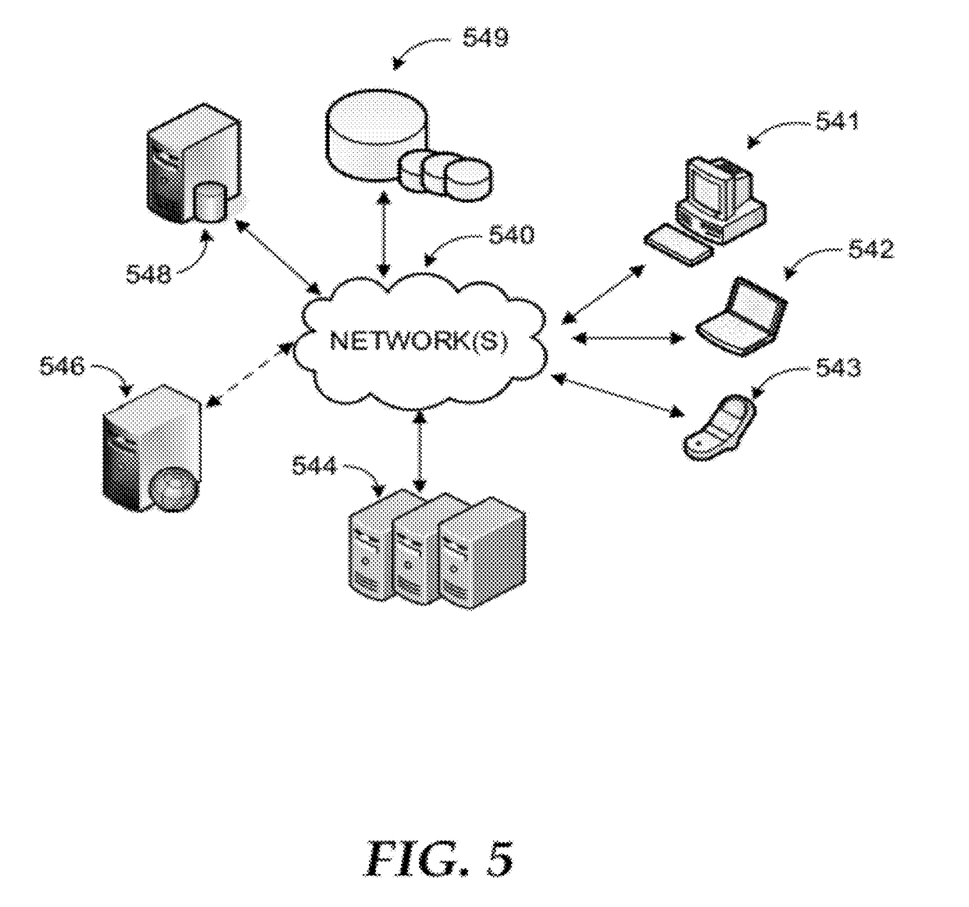
FIG. 5 is a networked environment, where a system according to embodiments may be implemented.

FIG. 5 is an example networked environment, where embodiments may be implemented. A custom style based corruption removal algorithm may be implemented via software executed over one or more servers 544 or a single server (e.g. web server) 546 such as a hosted service. The platform may communicate with thin client applications on individual computing devices such as a smart phone 543, a laptop computer 542, or desktop computer 541 ('client devices') through network(s) 540.

As discussed above, a document server may execute the algorithm on server side to process documents stored by the server. A user may run the corruption removal algorithm in an end device (any of the client devices 541-543, or a smart phone, a computer, a smart automobile console, etc.) The algorithm may remove unused or corrupt styles from the XML documents automatically or upon demand.

Client devices 541-543 may enable access to applications executed on remote server(s) (e.g. one of servers 544) as discussed previously. The server(s) may retrieve or store relevant data from/to data store(s) 549 directly or through database server 548.

Network(s) 540 may comprise any topology of servers, clients, Internet service providers, and communication media. A system according to embodiments may have a static or dynamic topology. Network(s) 540 may include secure networks such as an enterprise network, an unsecure network such as a wireless open network, or the Internet. Network(s) 540 may also coordinate communication over other networks such as Public Switched Telephone Network (PSTN) or cellular networks. Furthermore, network(s) 540 may include short range wireless networks such as Bluetooth or similar ones. Network(s) 540 provide communication between the nodes described herein. By way of example, and not limitation, network(s) 540 may include wireless media such as acoustic, RF, infrared and other wireless media.

Many other configurations of computing devices, applications, data sources, and data distribution systems may be employed to implement a corruption removal algorithm from XML documents. Furthermore, the networked environments discussed in FIG. 5 are for illustration purposes only. Embodiments are not limited to the example applications, modules, or processes.

Figure 6:
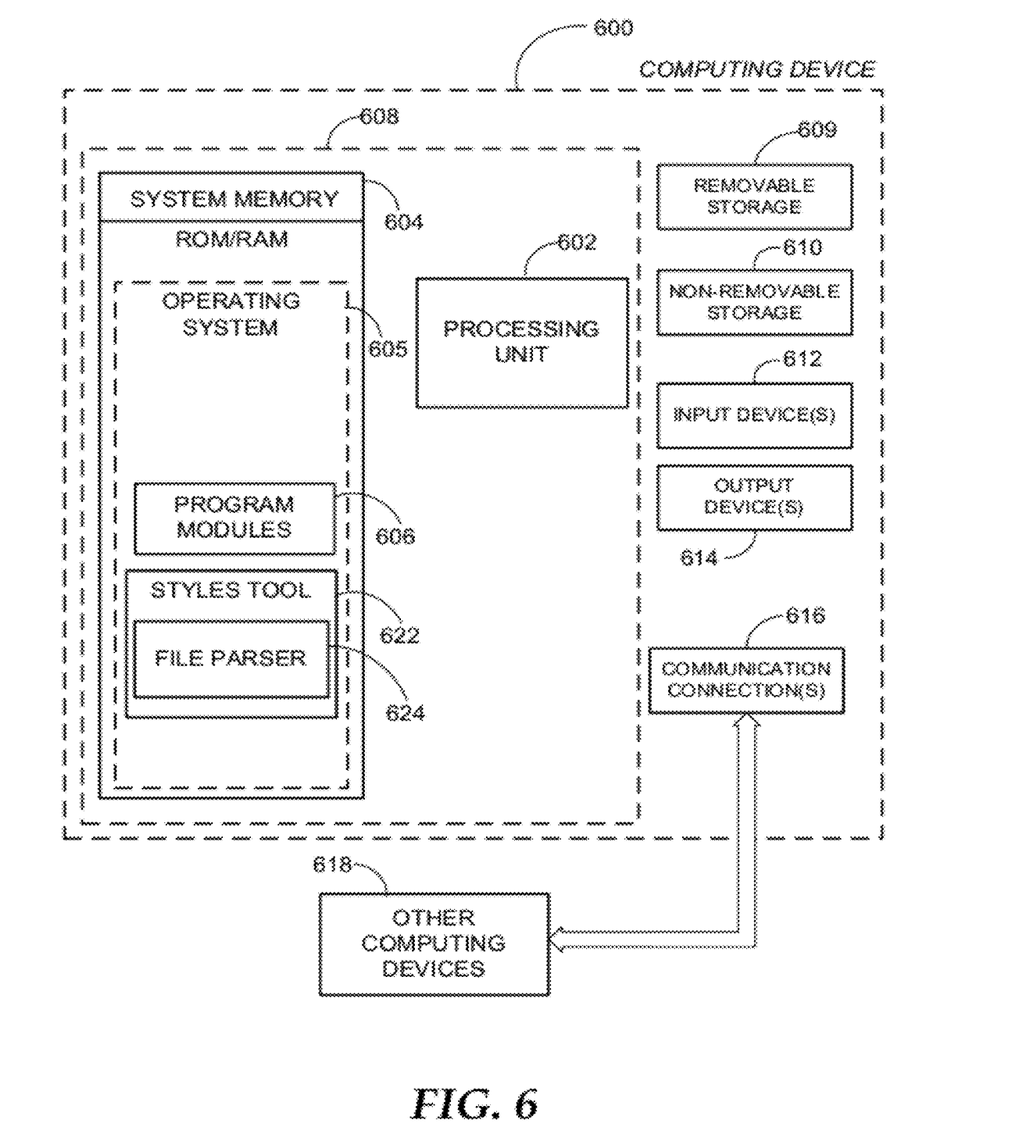
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a client device executing a document cleanup tool with corrupt style removal and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, styles tool 622, and file parser module 624.

Style tool 622 may be part of a service that removes custom style based corruption in XML files on client machines, servers, and other devices. File parser module 624 may remove corrupt, unused, or duplicate styles from XML documents. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
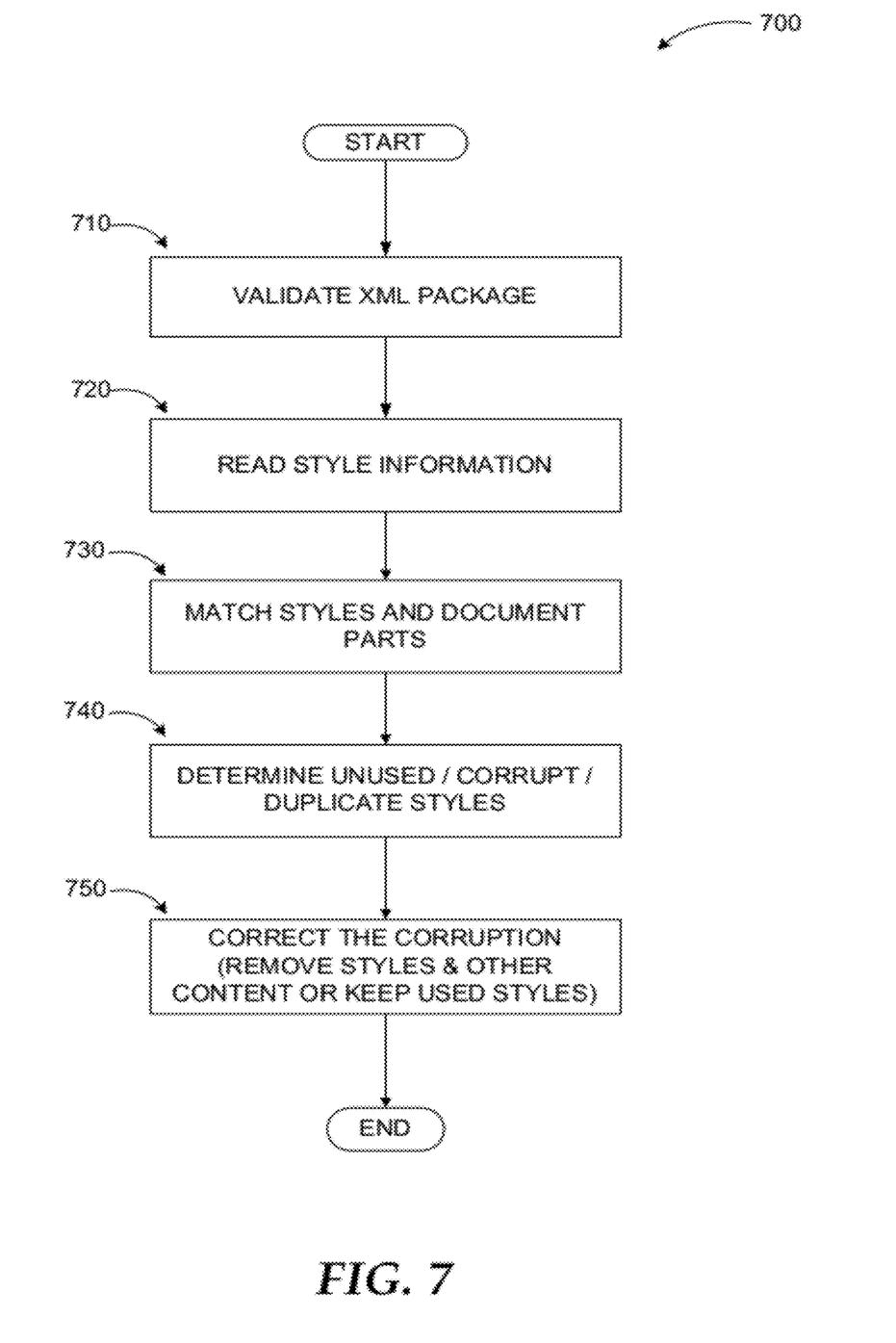
FIG. 7 illustrates a logic flow diagram for a process of removing corrupted styles in XML documents according to embodiments.

FIG. 7 illustrates a logic flow diagram for process 700 of removing corrupted styles in XML documents according to embodiments. Process 700 may be implemented by a client side algorithm or by a server side algorithm as part of a document storage server.

Process 700 begins with operation 710 which may verify that a package is an XML package, identify the file as an XML package, and determine whether the XML package is valid. The validity of the XML package may determine whether the algorithm may be able to correct any style corruption in the document. The algorithm may determine XML file validity by checking if the file has all parts defined by a standard for packaging XML documents. At operation 720, the algorithm may read style information from style parts of the package without opening the respective document(s) in a rich client application. The gathered style information may be used to match the styles with document parts at operation 730 determining unused, corrupted, and duplicate styles at operation 740.

Another decision point for the algorithm may be a number of styles. As mentioned previously, there may be a limit to the number of custom styles that can be used in a document. If that limit is exceeded, the entire document may be corrupted and unrecoverable. Thus, the algorithm may correct the corruption by removing unused and/or duplicate styles, as well as corrupt ones at operation 750. Alternatively, the algorithm may revert the document back to default styles. The algorithm may also identify and remove other corrupted content like corrupted named ranges and remove them. In case of other content the approach is similar to the one used for the styles: part definitions may be read in, whether the part is corrupted may be determined, if the part is not corrupted, content that needs to be removed may be identified (for example, testing for duplicates, testing to see if part content is being used in the document, and marking as used and/or unused). Users may then be enabled to decide on the cleanup path: for example, keep or remove definitions marked unused.

The operations included in process 700 are for illustration purposes. A corruption removal process according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for removing style corruption from extensible markup language (XML) based documents, the method comprising:
reading style information associated with an XML based document;
determining at least one from a set of unused, corrupted, and duplicate styles by matching style definitions for the document with style parts in a document package;
removing at least one from the set of the unused, corrupted, and duplicate styles without opening the XML based document in a rich application associated with the XML based document;
determining corrupted name ranges; and
removing the corrupted name ranges from the XML based document.

2. The method of claim 1, further comprising:
determining whether the document package is a valid XML package.

3. The method of claim 1, further comprising:
presenting an option to revert the XML based document to a default format; and
in response to an affirmative selection, reverting the XML based document to the default format by removing all custom styles.

4. The method of claim 1, wherein the XML based document is one of a spreadsheet, a chart, a word processor, and a presentation document.

5. The method of claim 1, further comprising:
determining whether the XML based document has more than a predetermined number of custom styles.

6. The method of claim 5, reverting the XML based document to a default format by removing all custom styles if the XML based document has more than the predetermined number of custom styles.

7. The method of claim 1, further comprising:
presenting the style information of the XML based document to a user; and
removing the unused, corrupted, and duplicate styles upon user affirmation.

8. The method of claim 1, further comprising:
removing the unused, corrupted, and duplicate styles automatically.

9. The method of claim 8, wherein the unused, corrupted, and duplicate styles are removed during an automated XML based document recovery.

10. A computing device for removing style corruption from extensible markup language (XML) documents, the computing device comprising:
a memory
a processor coupled to the memory, the processor executing a module in conjunction with instructions stored in the memory, wherein the module is configured to:
determine whether a document package including an XML based document to be examined is a valid XML based package;
read a style information associated with the XML based document;
determine at least one from a set of unused, corrupted, and duplicate styles by matching style definitions for the XML based document with style parts in a document package;

remove at least one from the set of the unused, corrupted, and duplicate styles without opening the XML based document in a rich application associated with the XML based document;

determine corrupted name ranges; and remove the corrupted name ranges from the XML based document.

11. The computing device of claim 10, wherein the module is further configured to:

determine whether the XML based document has more than a predetermined number of custom styles;

present an option to revert the XML based document to a default format; and in response to an affirmative selection, revert the XML based document to the default format by removing all custom styles.

12. The computing device of claim 10, wherein the module is one of a command line executable program, a program library, and a server tool set.

13. The computing device of claim 10, wherein the module employs a system input output component to directly access the XML based document.

14. The computing device of claim 10, wherein the module is implemented in a document sharing service automatically removing style corruption from shared documents at the service.

15. The computing device of claim 10, wherein the module is implemented as a style tool on a client device and further configured to present a graphical user interface providing options with configuration of removal of corrupted styles.

16. The computing device of claim 10, wherein the module is further configured to determine the validity of the document package based on evaluating whether all parts defined by a standard packaging protocol exist in the document package.

17. A computer-readable storage medium with instructions stored thereon for removing style corruption from extensible markup language (XML) documents, the instructions comprising:

determining whether a document package including an XML based document to be examined is a valid XML based package;

reading a style information associated with the XML based document;

determining whether the XML based document has more than a predetermined number of custom styles;

reverting the XML based document to a default format by removing all custom styles if the XML based document has more than the predetermined number of custom styles; else determining at least one from a set of unused, corrupted, and duplicate styles by matching style definitions for the XML based document with style parts in a document package;

removing at least one from the set of the unused, corrupted, and duplicate styles without opening the XML based document in a rich application associated with the XML based document;

determining corrupted name ranges; and removing the corrupted name ranges from the XML based document.

18. The computer-readable storage medium of claim 17, wherein the rich application associated with the XML based document includes one of: a word processing application, a spreadsheet application, a presentation application, a diagramming application, and a browsing application.

19. The computer-readable storage medium of claim 17, wherein an incorrect value in the XML based document is replaced by setting the incorrect value to a predetermined default value.

* * * * *